United States Patent
Astier et al.

(10) Patent No.: US 10,022,930 B2
(45) Date of Patent: Jul. 17, 2018

(54) METHOD FOR RETREADING A TIRE CASING COMPRISING A STEP OF INDUCTIVE HEATING

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Cedric Astier, Clermont-Ferrand (FR); Gregory Marcet, Clermont-Ferrand (FR)

(73) Assignees: Compagnie Generale des Etablissements Michelin, Clermont-Ferrand (FR); Michelin Recherche et Technique, S.A., Granges-Paccot (CH)

( * ) Notice: Subject to any disclaimer, the term of this patent is extended or adjusted under 35 U.S.C. 154(b) by 87 days.

(21) Appl. No.: 14/649,341

(22) PCT Filed: Dec. 4, 2013

(86) PCT No.: PCT/FR2013/052938
§ 371 (c)(1),
(2) Date: Jun. 3, 2015

(87) PCT Pub. No.: WO2014/087101
PCT Pub. Date: Jun. 12, 2014

(65) Prior Publication Data
US 2016/0200060 A1    Jul. 14, 2016

(30) Foreign Application Priority Data
Dec. 4, 2012  (FR) ..................... 12 61610

(51) Int. Cl.
*B29D 30/54* (2006.01)
*B60C 9/02* (2006.01)
(Continued)

(52) U.S. Cl.
CPC ............... *B29D 30/54* (2013.01); *B60C 9/02* (2013.01); *B60C 9/18* (2013.01); *B60C 9/2003* (2013.01);
(Continued)

(58) Field of Classification Search
CPC ........ B29D 30/58; B29D 30/30; B29D 30/54; B29D 30/52; B29D 30/56;
(Continued)

(56) References Cited

U.S. PATENT DOCUMENTS 6,401,779 B1 *  6/2002  Riva ................. B60C 9/0007
                                                      148/402
6,660,122 B1 * 12/2003  Prakash ........... B29C 35/0266
                                                      152/458
(Continued)

FOREIGN PATENT DOCUMENTS

CN      102026828 A       4/2011
DE      102011001877     10/2012
(Continued)

OTHER PUBLICATIONS

Ikeda (JP H08-216289, Aug. 27, 1996, machine translation).*
(Continued)

*Primary Examiner* — Martin K Rogers
*Assistant Examiner* — Sedef E Paquette
(74) *Attorney, Agent, or Firm* — Dickinson Wright PLLC

(57) ABSTRACT

A method for retreading a wheel tire casing:
 a wheel tire casing is induction heated so as to soften a thermally malleable layer located between a tread of the casing and a carcass of the casing,
(Continued)

the tread is removed from the carcass, and another tread is applied to the carcass.

5 Claims, 6 Drawing Sheets

(51) Int. Cl.
| | |
|---|---|
| *B60C 9/20* | (2006.01) |
| *B60C 99/00* | (2006.01) |
| *B60C 9/18* | (2006.01) |
| *B60C 11/02* | (2006.01) |
| *B29D 30/00* | (2006.01) |
| *B29D 30/56* | (2006.01) |

(52) U.S. Cl.
CPC ............ *B60C 11/02* (2013.01); *B60C 99/003* (2013.01); *B29D 30/0005* (2013.01); *B29D 30/56* (2013.01); *B29D 2030/541* (2013.01); *B29D 2030/544* (2013.01); *B29D 2030/548* (2013.01); *B60C 2009/2074* (2013.01)

(58) Field of Classification Search
CPC ........ B29D 2030/541; B29D 2030/547; B29D 2030/548; B29D 30/0005; B29D 2030/0674; B29D 2030/544; B29B 17/00; B29B 17/02; B29C 35/08; B29C 65/3644; B60C 11/02; B60C 99/003
USPC .... 152/152.1; 156/928, 96, 909, 272.2, 178, 156/718, 95; 29/403.4; 425/17, 174.8 R; 264/36.14, 486–487
See application file for complete search history.

(56) References Cited

U.S. PATENT DOCUMENTS

| | | | |
|---|---|---|---|
| 2002/0046796 A1 | 4/2002 | Hitotsuyanagi | |
| 2005/0067107 A1 | 3/2005 | Hitotsuyanagi | |
| 2005/0269008 A1* | 12/2005 | Takagi | ................. B60C 9/0007 152/527 |
| 2006/0124222 A1 | 6/2006 | Hitotsuyanagi | |
| 2011/0056603 A1* | 3/2011 | Koutoku | ............... B29D 30/52 152/450 |
| 2012/0241065 A1 | 9/2012 | Pirelli | |
| 2013/0220520 A1 | 8/2013 | Pirelli | |

FOREIGN PATENT DOCUMENTS

| | | | | |
|---|---|---|---|---|
| JP | 08216289 A * | 8/1996 | ............. | B29D 30/56 |
| JP | 9-207241 A | 8/1997 | | |
| JP | H09207241 A | 8/1997 | | |
| JP | 2002067031 | 3/2002 | | |
| JP | 2002067031 A * | 3/2002 | | |
| WO | 9908860 | 2/1999 | | |
| WO | WO 9908860 A1 * | 2/1999 | ............. | B29D 30/56 |
| WO | 2011073834 | 6/2011 | | |
| WO | 2012066415 | 5/2012 | | |

OTHER PUBLICATIONS

Takao Takasaki, JP 2002067031, Mar. 2002, machine translation.*
International Search Report for PCT/FR2013/052938 dated Mar. 4, 2014.
Written Opinion of the International Search Authority PCT/FR2013/052938 dated Jun. 4, 2015.
Notification of First Office Action dated May 27, 2016 in corresponding CN201380063134.1.

* cited by examiner

METHOD FOR RETREADING A TIRE CASING COMPRISING A STEP OF INDUCTIVE HEATING

This application is a 371 national phase entry of PCT/FR2013/052938, filed 4 Dec. 2013, which claims benefit of French Patent Application No. 1261610, filed 4 Dec. 2012, the entire contents of which are incorporated herein by reference for all purposes.

BACKGROUND

1. Field

The disclosure relates to the retreading of vehicle tires.

2. Description of Related Art

The operation of retreading conventionally consists in removing the worn tread from a tire casing in order to replace it with a new tread.

The document WO2009139449 discloses providing the tire with a hot-melt layer or more generally a thermally malleable layer that bonds the tread to the carcass. For the purpose of retreading, this layer is heated by radiation or by contact in order to soften it, thereby making it possible to easily remove the tread. A new tread can then be installed on the carcass.

SUMMARY

However, it has been found that the softening of the hot-melt layer takes a long time and requires a large amount of energy. In addition, this heating causes overcuring or re-curing of the casing or parts of the casing, thereby harming the mechanical properties of the latter.

It is an aim of embodiments of the invention to avoid these drawbacks.

To this end, provision is made according to an embodiment of the invention of a method for retreading a wheel tire casing, wherein:
  a wheel tire casing is induction heated so as to soften a thermally malleable layer located between a tread of the casing and a carcass of the casing,
  the tread is removed from the carcass, and
  another tread is applied to the carcass.

Thus, the induction heating makes it possible to directly heat elements inside the casing. Therefore, the hot-melt layer is heated more rapidly and the amount of energy required to this end is reduced. Moreover, in most cases, the embodiment of the invention makes it possible to avoid heating all of the casing. It therefore becomes easier to preserve those parts of the casing which are sensitive to increases in temperature.

Preferably, the heating is carried out by means of an inductor comprising a single turn.

In one embodiment, an inductor (16) is disposed such that a main plane of the inductor is locally perpendicular to metal elements (15, 24) contained in the casing (2), said metal elements being chosen so as to heat the thermally malleable layer (14) in a preferential manner.

Thus, the region of the casing to be heated by induction is targeted more precisely. In addition, by choosing the orientation of the inductor, the heating of certain elements is favoured over others depending on their orientation.

In one embodiment, the thermally malleable layer is interposed radially between the tread and a crown reinforcing belt formed from one or more mutually parallel layers of metal threads that are coated in a rubber compound and make an angle with the circumferential direction of the tire, and an inductor is disposed such that a main plane of the inductor is locally perpendicular to the orientation of the metal threads in the radially external layer of the reinforcing belt.

In another embodiment, the layer is interposed radially between the tread and a crown reinforcing belt formed from one or more mutually parallel layers of metal threads that are coated in a rubber compound and make an angle with the circumferential direction of the tire, and an inductor is disposed such that a main plane of the inductor is locally parallel to the orientation of the metal threads in the radially internal layer of the reinforcing belt.

Specifically, the orientation of the inductor makes it possible to select the elements of the casing, in particular the metal reinforcers, that it is desired to heat first and foremost. Thus, the greater the angle between the inductor and the element, the more the magnetic permeability of the latter is increased and the more the field lines can be looped through the element. Thus, when the inductor is perpendicular to the element, the field lines are parallel to the latter. The permeability of the element is thus as high as possible and the field lines are looped back best in this element. Conversely, when the inductor is parallel to the element, minimal permeability is obtained since the field lines have to be looped through the element and the surrounding rubber or the other surrounding elements. Thus, in this case, the heating of the elements which are not parallel to the inductor is promoted in this position. When two elements form an angle between one another, all that is necessary is to place the inductor in a position parallel to the one which it is desired to heat least. The other then forms an angle with the inductor and heats more than the one which is parallel thereto.

Preferably, elements of the layer or in contact with the layer are heated directly by induction.

In this case, heating is thus produced directly within the layer to be softened or on the latter. Heating or excessively heating other parts of the casing is avoided in this way.

Advantageously, at least some of the elements are elongate in a direction that is locally not parallel to metal reinforcers of the casing.

It is thus possible to orient the inductor so as to heat these elements more than the metal reinforcers.

For example, at least some of the elements extend in a radial plane with respect to a main axis of the casing.

This orientation is advantageous since the metal reinforcers of a casing extend most frequently in planes that are not radial with respect to the axis of the casing.

In one embodiment, at least some of the elements form particles that are dispersed in the layer.

Provision is also made according to an embodiment of the invention of a vehicle wheel tire casing which comprises:
  a carcass,
  a tread, and
  a layer that is located between the carcass and the tread and comprises a material that is able to soften at a temperature at which the carcass and the tread do not soften,
  the casing comprising elements that are able to be heated directly by induction and are contained in the layer or in contact with the layer.

According to one embodiment, the elements that are able to be heated are metal elements contained in the layer or metal elements contained in a heating layer in contact with the layer.

The casing could thus also have at least any one of the following features:
  at least some of the elements are elongate;

at least some of the elements are elongate in a direction that is locally not parallel to the metal reinforcers of the casing, when the casing also contains metal reinforcers that are able to be heated and are contained in a reinforcing ply;

at least some of the elements extend in a radial plane with respect to a main axis of the casing; and at least some of the elements formed particles that are dispersed in the layer.

In one embodiment, the casing does not have any metal reinforcers remote from the layer.

According to one embodiment, the elements that are able to be heated are metal reinforcers contained in a reinforcing ply.

BRIEF DESCRIPTION OF DRAWINGS

One embodiment of the invention will now be presented with reference to the appended drawings, in which.

DETAILED DESCRIPTION OF SPECIFIC EMBODIMENTS

Figure 1:
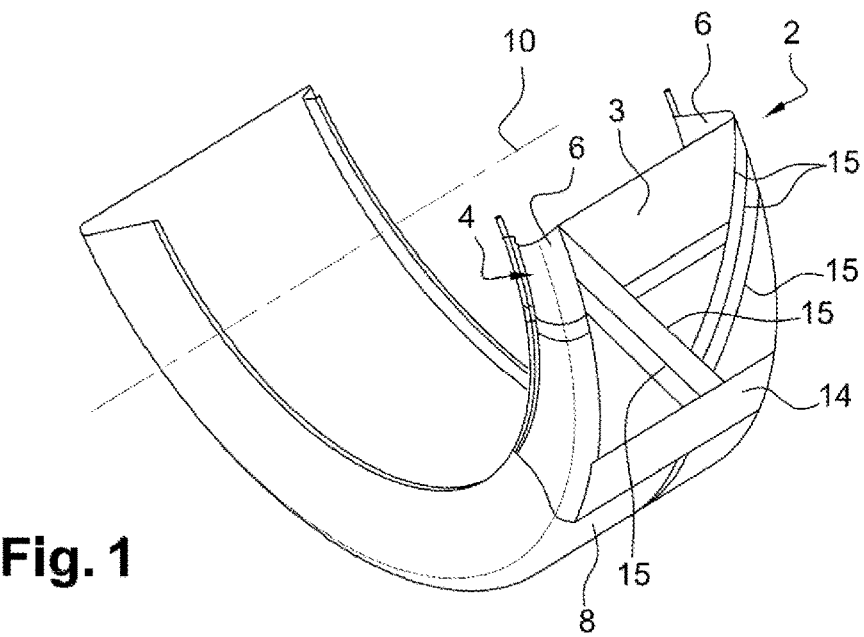
FIG. 1 is a partially cutaway perspective schematic view of a part of a casing intended to be retreaded by means of an embodiment of the method of the invention.
Figure 2:
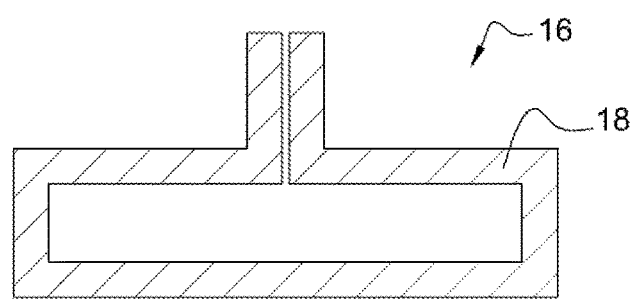
FIG. 2 is a schematic elevation view of an inductor used in an embodiment of the method of the invention.

One embodiment of the method of the invention will be described with reference to FIGS. 1 to 9. This method is applied to a wheel tire casing 2. The wheel may be a wheel of a vehicle of the light type, of a utility vehicle, of a vehicle of the heavy goods type or, alternatively, of a civil engineering vehicle.

The casing 2 comprises a carcass 4 the shape of which is substantially toroidal and which has a crown 3 with a shape similar to that of a cylinder and two lateral sidewalls 6. The casing also comprises a tread 8 that is disposed on the radially external part of the crown. The tread originally has tread patterns on its external face 12 but these may have partially or completely disappeared depending on the level of wear of the tread.

In a manner known per se, the stability of the crown is ensured by a belt formed from one or more layers of mutually parallel metal threads 15 that are coated in a rubber compound and make an angle with the circumferential direction of the tire. The threads 15 of the crown reinforcing belt can form a zero angle with the circumferential direction, in which case this is referred to as a hooping ply or zero-degree ply, or form an angle that can usually be between 15° and 35°.

The casing comprises an interface layer 14 interposed in the radial direction with respect to the axis 10 between the carcass 4 and the tread 8. In this case, the layer is a layer made of a thermoplastic and hot-melt material, that is to say a material that is able to soften or melt when it is subjected to heating until a predetermined temperature that is characteristic of this material is reached. This temperature is such that the rubber of the carcass and that of the tread are not softened at this temperature.

In order to implement the embodiment of the method of the invention, use is made of an inductor 16 which preferably comprises a single flat turn 18 made of an electrically conductive metal. In addition, the central part of this turn has a rectangular shape, the ends of the turn emerging from the central part on one and the same longitudinal side of the rectangle.

In the present example, the inductor 16 also comprises two ferrites 20 that are formed by small plates that cover the two opposite respective main faces of the turn in order to sandwich the latter between the ferrites. The ferrites make it possible to channel the magnetic field lines 22 which have been illustrated in some of the figures. Each of these lines forms a closed loop which passes through the turn 18 perpendicularly to the plane thereof and leaves the inductor via the ends of the respective ferrites.

Figure 3:
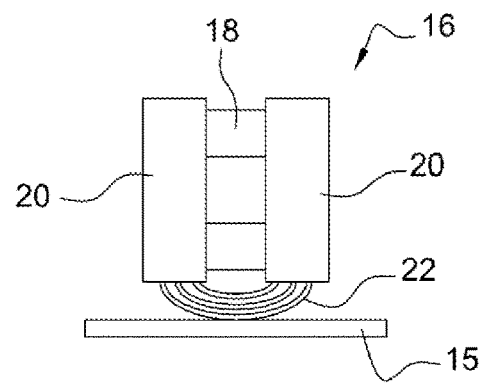
FIGS. 3, 4 and 5 are schematic views of the inductor and of the casing during the implementation of an embodiment of the method of the invention.
Figure 4:
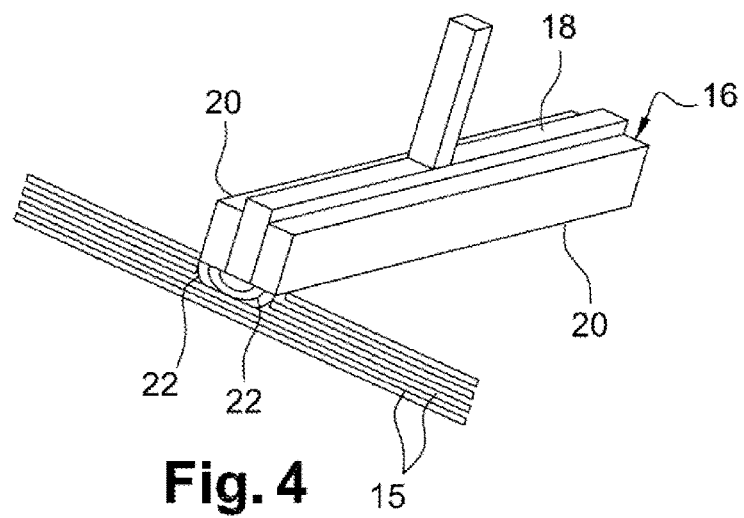
Figure 5:
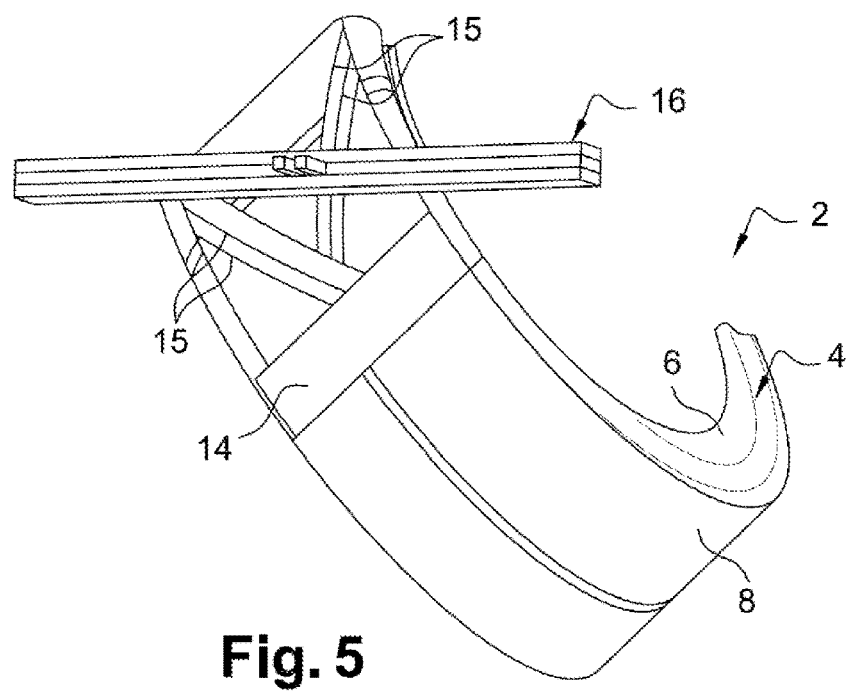

In order to implement the embodiment of the method of the invention, the inductor 16 is moved towards the casing 2 that it is desired to detread. As illustrated in FIGS. 3 to 5, with the inductor being supplied with electric current, it is moved towards the casing so as to locally induction heat at least some of the metal threads 15. The inductor is disposed such that its main plane is not locally tangent to the tread. Depending on the orientation of the inductor, direct induction heating of at least some of the threads 15 is thus carried out. The heat produced by Joule effect in the threads 15 is transmitted by conduction to the surrounding parts of the casing and in particular to the intermediate layer 14, which can thus soften. The tire is then moved relative to the inductor so as to locally heat other regions of the same layer 14. When the latter has been softened over a sufficient area, for example through a complete turn about the axis 10, the tread 8 can be removed for example by peeling. Next, a bonding layer is deposited on the carcass thus freed of the tread, followed by a new tread. The latter can be made of raw rubber and the casing is then cured in order to vulcanize the rubber of the tread.

It has been shown that the inductor heats the threads better the closer the angle formed by the plane of the inductor with the threads is to 90°.

Figure 6:
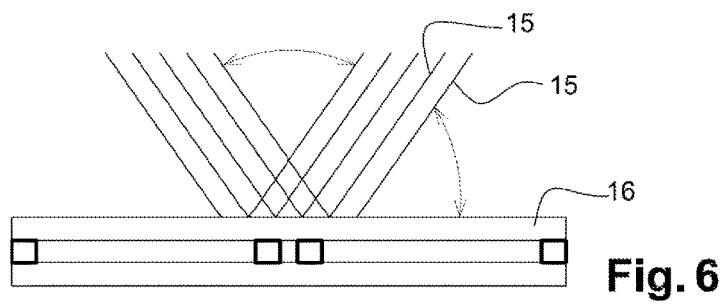
FIGS. 6, 7, 8, and 9 illustrate schematically four different orientations of the inductor with respect to elements of the casing during the implementation of the method.

Thus, with reference to FIG. 6, the inductor is inclined with respect to each of the groups of parallel reinforcers which are themselves inclined with respect to one another. In this example, the inductor is disposed such that its plane is radial with respect to the axis 10. Heat is thus generated directly in the reinforcers 15 of the two groups. The two reinforcing plies heat in the same way by induction.

However, this disposition is not necessarily favourable given that it is detrimental to the strength of the tire to excessively heat the plies that form the crown reinforcing belt, so as to avoid destroying the physicochemical bonds between the elastomer matrix and the threads.

Therefore, the inductor will be oriented so as to preferentially heat the threads located radially directly in contact with the thermally malleable layer 14. In a first configuration, the radially external ply of the belt will therefore be heated in a preferential manner or, alternatively, the inductor will be oriented so as to avoid heating the radially internal ply of said belt.

It is also quite possible to envisage disposing a heating ply directly between the crown belt and the thermally malleable layer 14.

Finally, in another configuration, metal threads could be disposed directly in the thermally malleable layer 14 so as to avoid heating the plies of the reinforcing belt.

Figure 7:
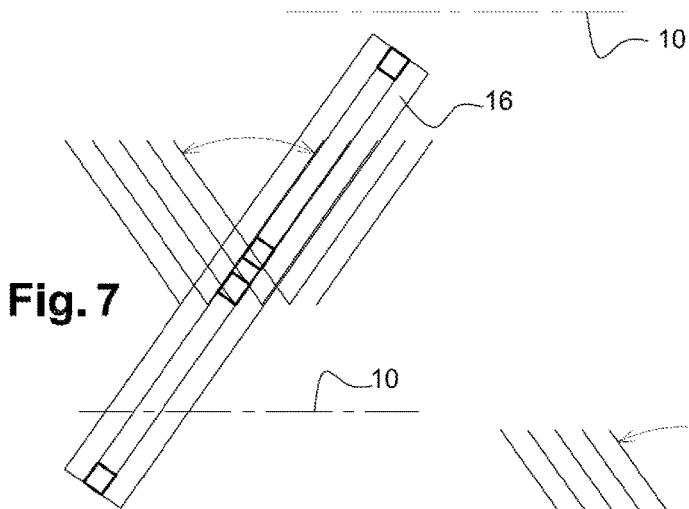

In the example in FIG. 7, the orientation of the inductor is modified such that its plane is parallel to the reinforcers 15 of one of the two groups corresponding to the layer of reinforcing threads of the crown belt located radially towards the inside. It thus remains inclined with respect to those of the other group located radially more towards the outside. Since this operation is pronounced and close to the perpendicular, it produces particularly high heating in the reinforcing threads of the radially external ply of the belt, whereas the heating produced in the other reinforcers located in the radially innermost part of the belt is very low in comparison. As was indicated above, the reinforcers that are strongly inclined with respect to the inductor are particularly permeable to the magnetic field lines, whereas the permeability of those which are parallel to the inductor is particularly low.

Figure 8:
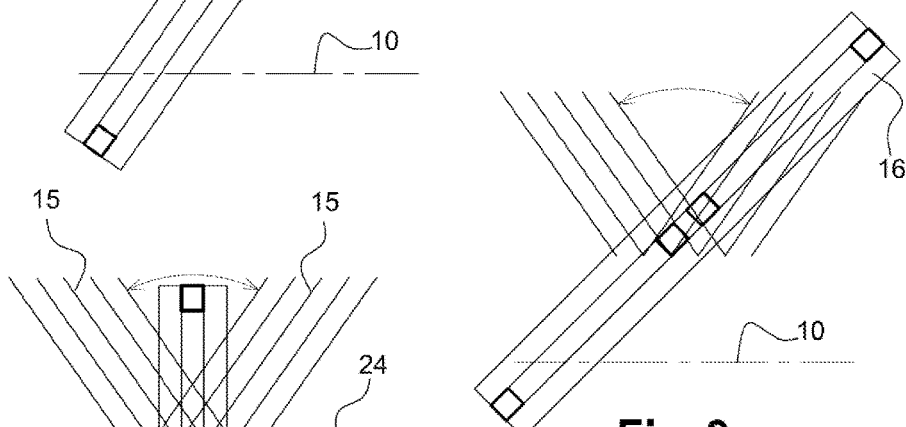

In the example in FIG. 8, the inductor is oriented such that its plane is perpendicular to the reinforcers 15 of one of the groups that preferably form the radially external ply of the crown belt, and weakly inclined with respect to those of the other group. This orientation is thus optimal for the heating of the reinforcers of the first group. As before, the heating of the reinforcers of the other group is poor in comparison.

Figure 9:
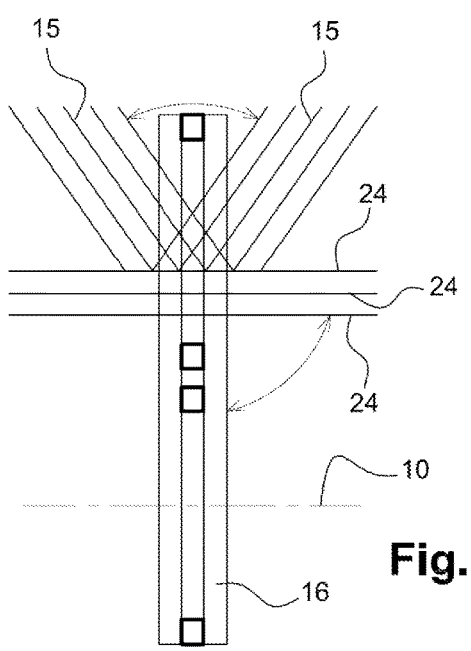

In another embodiment illustrated in FIG. 9, provision can be made to provide the layer 14 with metal elements 24 that are formed for example from mutually parallel threads that extend in radial planes with respect to the axis 10. In addition, these threads are inclined with respect to the reinforcers 15 in the part of the casing in question. Consequently, if the inductor is disposed such that its plane is perpendicular to the axis 10, it is possible to heat the threads 24 in an optimal manner by induction, while heating the reinforcers 15 moderately by induction. Since the threads 24 extend in the layer 14 itself, the heat generated is directly communicated thereto such that said layer 14 softens even before a large amount of this heat is transmitted to the other parts of the casing by conduction. This embodiment thus makes it possible to avoid excessively heating the reinforcing elements and excessively exposing them to the magnetic field and also to preserve the constituents of the casing which are close thereto from significant rises in temperature. In addition, since the elements 24 do not have a mechanical reinforcing function in the casing, it is possible, while the casing is being manufactured, to dispose them at the most favourable location, that is to say at the location where the heating should be effected first and foremost during the implementation of the retreading method.

Provision can be made to give the threads 24 a configuration and an orientation that are different from those illustrated in FIG. 9. However, it is preferable for these threads not to be locally parallel to the reinforcers 15 in order that they can be heated directly by induction without excessively heating the reinforcers 15 located in the same part of the casing. Provision can also be made for the elements 24 to be contiguous with the layer 14 but not included in the latter.

Lastly, it is appropriate to ensure that the density of the threads present in the layer 14 is sufficient to obtain an amount of heat that is greater or even much greater than the density of heat originating from the threads of the reinforcing ply. Specifically, the amount of heat produced by the inductor is, as has already been mentioned, proportional to the inclination of the inductor, but also proportional to the number of metal threads per unit area. This density can be increased by decreasing the pitch between two threads or by increasing the number of strands present in each of the threads which then form a cord. It is thus appropriate to use successive tests to adjust the optimal density of the threads inserted into the thermally malleable layer that is intended to receive the greatest part of the magnetic flux originating from the inductor, so as to minimize the part of the flux that will heat the threads of the reinforcing plies of the crown belt.

It can thus be seen that the choice of orientation of the inductor with respect to the casing makes it possible to select the elements to be heated first and foremost by induction.

Figure 10:
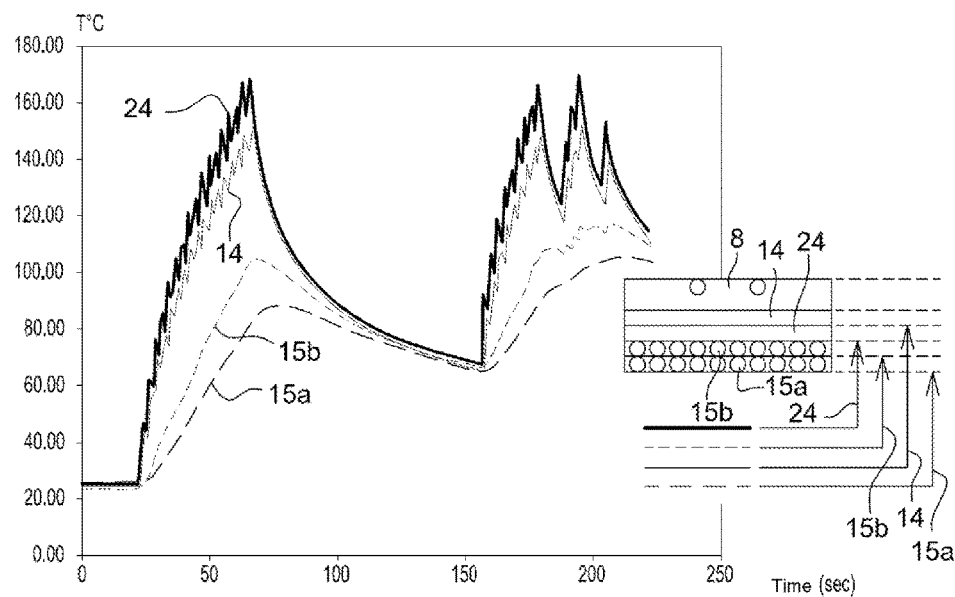
FIGS. 10, 11, 12, 13, and 14 are graphs of curves illustrating the rise in temperature in the casing over time during different modes of implementing an embodiment of the method of the invention.

FIG. 10 illustrates the change in temperature in different layers of the casing during the implementation of the method, over time indicated on the X-axis. As illustrated in the label, the casing is considered to comprise in particular, in this order from bottom to top, a stack of metal reinforcers 15a, metal reinforcers 15b, a heating layer formed from the elements 24, the layer 14 and finally the tread 8, these different layers being contiguous with one another.

Since the inductor is initially off, the temperature of these different layers is the ambient temperature close to 20°. The inductor is then started up by supplying it with electric current. It can be seen that the increase in temperature is greater in the layers 14 and 24 than in the layers 15a and 15b. In particular, both the values measured and the general gradient of the curves are higher. In this example, before the inductor is switched off, the layers 15a and 15b do not reach a temperature of 110° while the layers 14 and 24 have reached a temperature of 150°. After the inductor is switched off, the temperature of all of the layers drops again in order to stabilize in a uniform manner in the region of 70°. When the inductor is turned on again, the same phenomena occur as before, including when the inductor is activated intermittently. In this example, the reinforcers 15a and 15b form angles of 25° and −25°, respectively, with respect to the median plane of the tire perpendicular to the axis 10.

Figure 11:
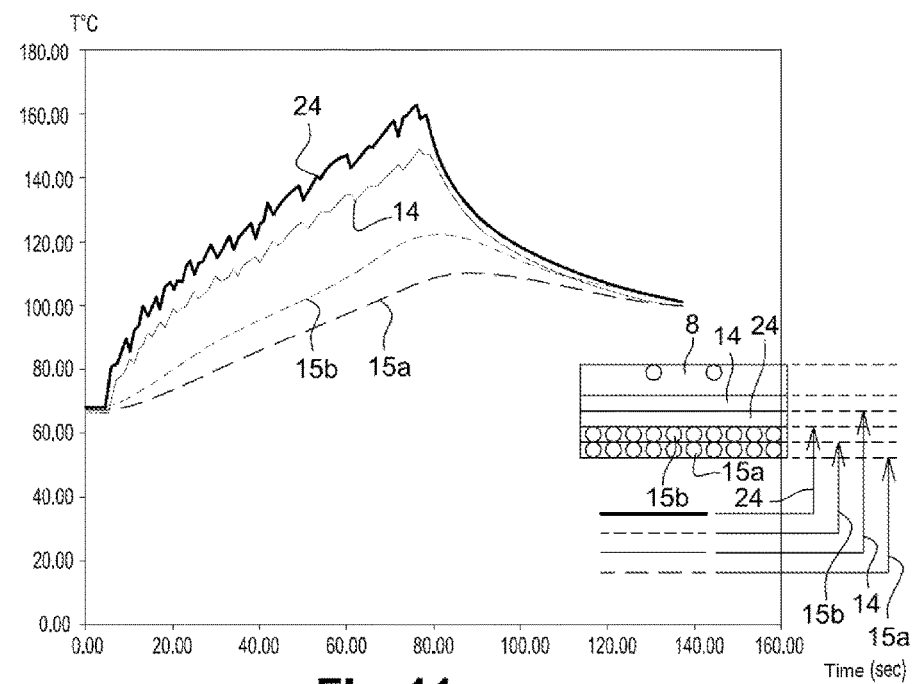

The same types of curves are illustrated in FIG. 11, with the level of power of the current to the inductor and the distance of the latter with respect to the casing being modified. The temperatures and the gradients obtained are different, but the same overall behaviour as in the case of FIG. 10 is found. In particular, the temperature obtained is higher in the layers 14 and 24 than in the layers of reinforcers 15a and 15b.

Figure 12:
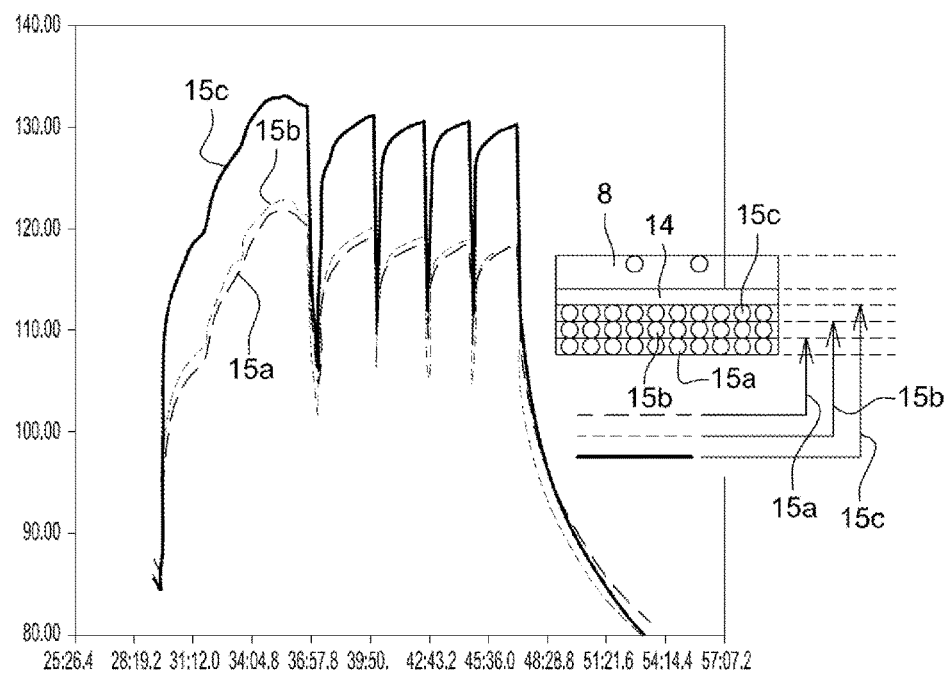

Similar curves have been illustrated in FIG. 12. This time, the casing comprises three layers of reinforcing elements 15a, 15b and 15c that are disposed from the inside to the outside of the casing in this order, the layer 15c being contiguous with the layer 14. The layers 15a, 15b are as described above. The layer 15c comprises metal reinforcing elements that extend in a plane perpendicular to the axis 10 or at an orientation of 0°, that is to say circumferentially. Since the inductor extends in a radial plane with respect to the axis, a greater and more rapid rise in temperature is brought about in the layer 15c, and thus in the layer 14, than in the two other layers, as before, including with intermittent heating.

By varying the time for the increase in temperature, the temperature offset between the plies of metal reinforcers and the layer 14 and the heating elements 24 thereof is varied. Specifically, in the presence of a poor thermal conductor such as the natural rubber that forms the rubber material, it is possible to very rapidly increase the temperature locally in the region of the element directly heated by induction while the surrounding material does not have the time to heat up. Consequently, the higher the power supplied, the lower the energy supplied and the less the material in the vicinity of the heated element increases in temperature. It is possible to take account thereof in order to better achieve the target temperature.

Figure 13:
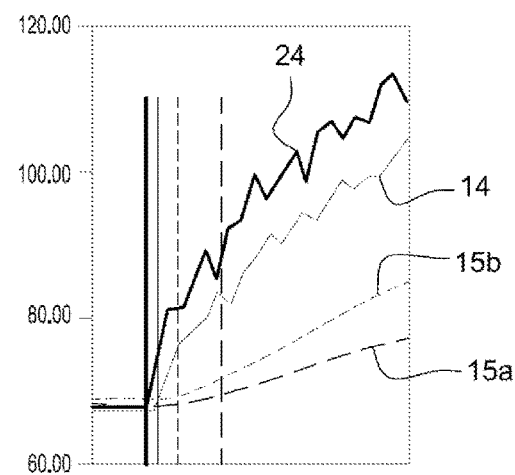

FIG. 13 illustrates a view on a larger scale of the start of the curves in FIG. 11, emphasizing this delay effect. The curves show a delay in the rise in temperature which is greater the further the measuring point is from the heating zone.

Figure 14:
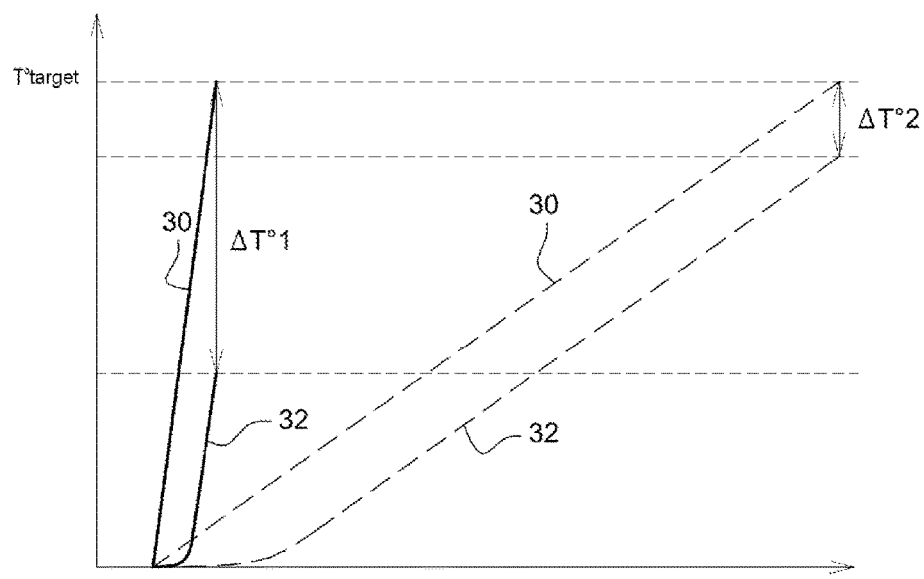

In order to better visualize this phenomenon, these curves have been extrapolated in FIG. 14. In the two cases indicated respectively by way of solid lines and dotted lines, the curve 30 illustrates the temperature of the heating layer while the curve 32 illustrates the temperature of a layer at a distance from the latter and heated by conduction. It can be seen that the speed of the increase in temperature is greater the greater the temperature offset between the curves itself is. It is thus possible to take advantage of the inclination of the curve and of the time for the increase in temperature to reach the target temperature better in the region of the bonding layer 14 to be heated without excessively heating the other layers. In one variant of the method, it is possible to heat the casing by induction after the tread has been removed in order to make it easier to adhere the new tread to the carcass over the layer 14.

Of course, numerous modifications could be made to the invention without departing from the scope thereof.

The invention claimed is:

1. A method for retreading a wheel tire casing comprising:
   inductively heating the wheel tire casing so as to soften a thermally malleable layer located between a tread of the casing and a carcass of the casing, then
   removing the tread from the carcass, and then
   applying another tread to the carcass;
   wherein the wheel tire casing further comprises a radially external layer of reinforcing threads inclined with respect to a tire circumferential direction and a radially internal layer of reinforcing threads inclined with respect to the tire circumferential direction, wherein the inductively heating step is performed with an inductor oriented such that the inductor extends along a longitudinal axis, wherein the longitudinal axis is oriented either perpendicular or close to perpendicular to the reinforcing threads of the external layer so as to produce particularly high heating in the reinforcing threads of the external layer and heating of the threads of the internal layer that is much lower in comparison, whereby the longitudinal axis of the inductor is neither parallel nor perpendicular to a main axis about which the wheel tire casing rotates.

2. The method according to claim 1, wherein the inductive heating is carried out by means of the inductor comprising a single turn.

3. The method according to claim 1, wherein the inductor is oriented such that the longitudinal axis of the inductor is perpendicular to metal elements contained in the casing, said metal elements being configured to heat the thermally malleable layer.

4. The method according to claim 1, wherein the thermally malleable layer is interposed radially between the removed tread and a crown reinforcing belt formed from one or more layers of mutually parallel metal threads that are coated in a rubber compound and make an angle with a circumferential direction of the tire, and wherein the inductor is oriented such that the longitudinal axis of the inductor is perpendicular to the orientation of the metal threads in the radially external layer of the reinforcing belt.

5. The method according to claim 1, wherein the thermally malleable layer is interposed radially between the removed tread and a crown reinforcing belt formed from one or more layers of mutually parallel metal threads that are coated in a rubber compound and make an angle with the circumferential direction of the tire, and wherein the inductor is oriented such that the longitudinal axis of the inductor is parallel to the orientation of the metal threads in the radially internal layer of the reinforcing belt.

* * * * *